Feb. 1, 1944.  A. E. CHERNACK  2,340,794
COLLAPSIBLE TUBING
Filed Feb. 10, 1942  2 Sheets-Sheet 1
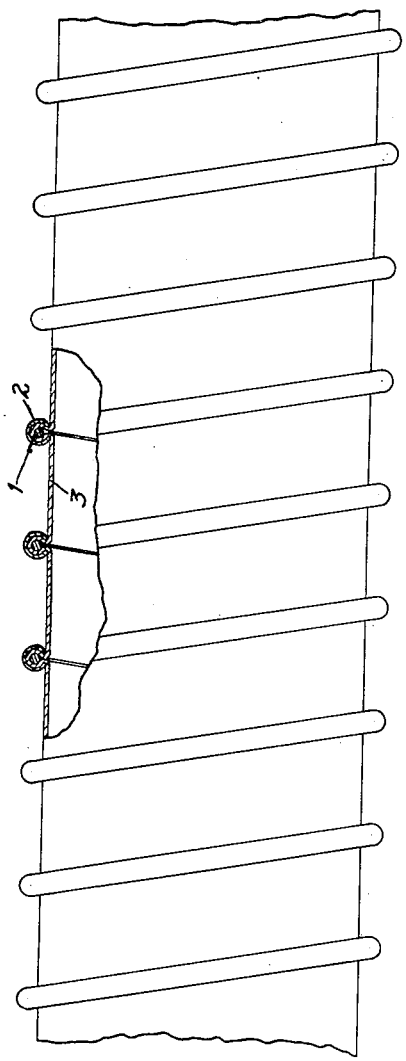
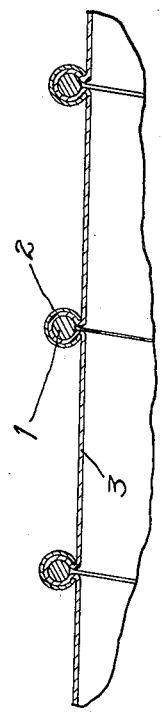
INVENTOR
ABEL E. CHERNACK
BY HIS ATTORNEYS
Howson and Howson Feb. 1, 1944.  A. E. CHERNACK  2,340,794
COLLAPSIBLE TUBING
Filed Feb. 10, 1942  2 Sheets-Sheet 2
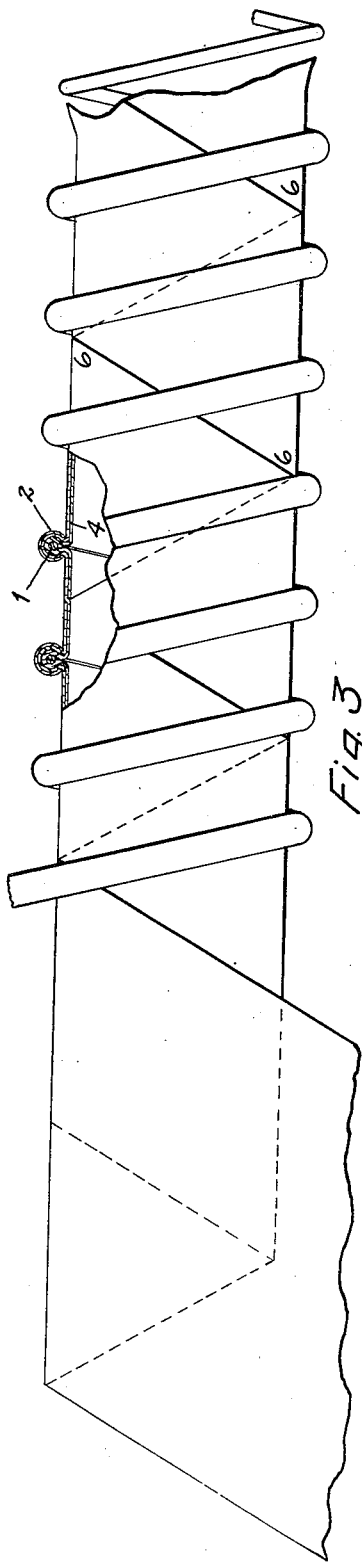
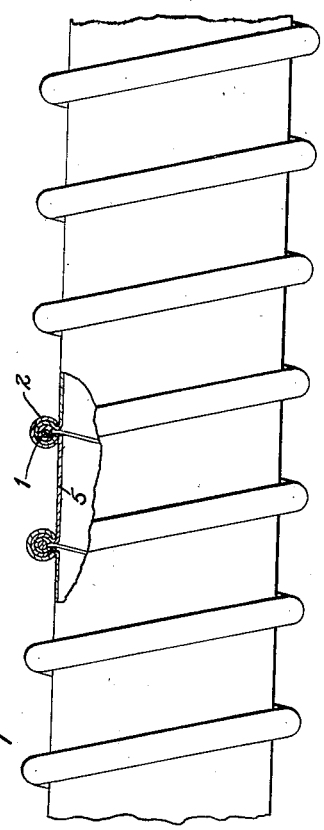
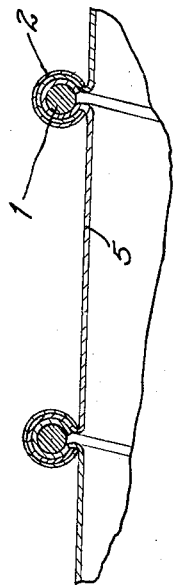
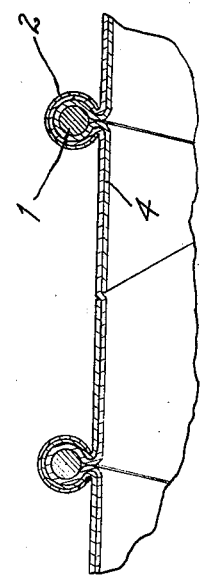
INVENTOR
ABEL E. CHERNACK
BY HIS ATTORNEYS
Howson and Howson Patented Feb. 1, 1944

2,340,794

UNITED STATES PATENT OFFICE 2,340,794

COLLAPSIBLE TUBING

Abel E. Chernack, Elmwood, Conn.

Application February 10, 1942, Serial No. 430,289

7 Claims. (Cl. 138—53)

This invention relates to flexible tubing and more particularly to collapsible tubing and it is an object of this invention to provide tubing of the type described which, although of comparatively large diameter and considerable length, can be collapsed or compressed to a relatively short length suitable for convenient transportation. It is also an object of this invention to provide a tube of the type described which can be readily collapsed and extended and which will retain a neat appearance in both the extended and collapsed conditions despite repeated and hurried manipulation from one condition to the other.

In the drawings which show preferred constructions of tubing in accordance with this invention—

Figure 1 is a fragmentary view, partly in elevation and partly in section, of a tubing constructed in accordance with this invention;

Figure 2 is a view, drawn to a larger scale, of the portion of the tubing shown in section in Figure 1;

Figures 3 and 4 are views similar to Figures 1 and 2 respectively of a tubing constructed in accordance with this invention, but of modified construction; and Figures 5 and 6 are views similar to Figures 1 and 2, respectively, of an additional modification of tubing constructed in accordance with this invention.

At the present time there is frequent need for lengths of flexible tubing of comparatively large diameter as in heating airplane engines prior to starting in cold weather and such uses render it necessary that the tubing be readily transportable from place to place. As the necessary length of such a tubing is frequently as much as 20 feet and its diameter 6 inches, it is inconvenient to convey such tubing from place to place for use unless the tubing can be collapsed to a considerably shorter length for transportation. Then in order to avoid undue loss of time the collapsing and extending of the tubing should be readily and quickly accomplished and such manipulation should not cause the tubing to become misshapen or crack the material of which the tubing is formed.

To provide a collapsible tubing having the desired characteristics for such use, a tubing constructed in accordance with this invention comprises as shown in Figures 1 and 2 a continuous spiral 1 of suitable spring material, as steel wire, a tubular fabric 3 covering the spiral spring 1 and a continuous strip 2 of brass or other suitable material bent around the spring 1 throughout its length so as to secure the tube 3 and spring 1 against relative movement at all times. The strip 2 also serves to tighten the fabric of the tubing 3 so that a smooth appearance is presented when the tubing is extended and the fabric between the spring coils tends to fold in a uniform manner when the tubing is compressed. The fabric tubing may be formed of any suitable material such as cotton cloth, fireproofed or otherwise treated or asbestos cloth where fire protection is necessary or other suitable materials may be used.

The fabric, or other material, covering the spring to form the tubing need not be formed as a tube but may be in the form of strips wrapped about the spring. In the construction illustrated in Figures 3 and 4 the spiral spring 1 is covered by a plurality of overlapping layers formed by wrapping a strip 4 of suitable material about the spring 1. The strip 4 is shown wound on a pitch greater than that of the spring 1 and overlapping half of its width. The edges 6 of the strip are coated with a cement or other suitable adhesive to cause the layers to be joined, as wrapped, into a closed tube. The covering is then secured to the spring by a metallic strip 2 which is clamped about the coils of the spring as in the construction of Figures 1 and 2.

Where a tubing need not comprise a plurality of layers of the covering material as shown in Figures 3 and 4 it may be formed of a strip of a width slightly greater than the distance between two convolutions of the spring, the strip being wound about the spring on the same pitch as the spring. As shown in Figures 5 and 6 such a strip 5 is so wound and overlaps adjacent coils of the spring 1 sufficiently to have its overlapping edges clamped to the coils of the spring 1 by a metallic strip 2 similar to the corresponding strips 2 in the other constructions. The clamping of the overlapping edges to the spring provides a closed tube with a wall formed of a single thickness of the covering material.

Tubes formed as above described are flexible when extended and are held in a smooth tubular shape by the spiral spring 1. The fabric, or other material being readily folded, does not interfere with the collapsing and extending movements of the spiral spring while clamping the covering material so that it tends to be held inwardly of the spring biases the covering material towards an inward fold and provides a neat appearance when the tubing is collapsed.

What is claimed is:

1. A collapsible tubing comprising a spiral spring, covering means surrounding said spring to form a tube held expanded by said spring and clamping means engaging said covering means with said spring.

2. A collapsible tubing comprising a spiral spring, covering means surrounding said spring to form a tube held expanded by said spring and means clamping said covering means to said spring throughout the length of said spring.

3. A collapsible tubing comprising a spiral spring, covering means surrounding said spring to form a tube held expanded by said spring and spiral metallic means securing said covering means to said spring.

4. A collapsible tubing comprising a spiral spring, covering means surrounding said spring to form a tube held expanded by said spring and a metallic strip folded over said covering means and spring and securing said covering means and spring together.

5. A collapsible tubing comprising a spiral spring, covering means surrounding said spring to form a tube held expanded by said spring and a spiral metallic clamping strip securing said covering means along said spring.

6. A collapsible tubing comprising a spiral spring, a covering strip wrapped about said spring, said strip having its edges overlapping to provide a plurality of layers forming a tube surrounding said spring and held expanded thereby and a metallic clamping strip securing said covering strip to said spring.

7. A collapsible tubing comprising a spiral spring, a covering strip wrapped about said spring at a pitch greater than the pitch of said spring, said covering strip overlapping to form a tubular covering for said spring having a thickness of a plurality of layers of said covering strip, said tubular covering being held expanded by said spring, and a metallic clamping strip folded about said spring and securing said covering strip between said metallic strip and said spring.

ABEL E. CHERNACK.